United States Patent [19]
Szetela

[11] 3,954,389
[45] May 4, 1976

[54] TORCH IGNITER

[75] Inventor: Eugene J. Szetela, South Windsor, Conn.

[73] Assignee: United Technologies Corporation, Hartford, Conn.

[22] Filed: Dec. 19, 1974

[21] Appl. No.: 534,316

[52] U.S. Cl. .............................. 431/353; 239/406; 431/182; 431/285; 431/352
[51] Int. Cl.² ..................................... F23D 11/38
[58] Field of Search ................... 239/405, 406, 403; 431/351, 353, 352, 285, 181, 182

[56] References Cited
UNITED STATES PATENTS

| | | | |
|---|---|---|---|
| 1,564,064 | 12/1925 | Hannah | 239/405 |
| 2,046,592 | 7/1936 | Tracy | 239/405 X |
| 2,837,893 | 6/1958 | Schirmer | 431/352 X |
| 3,367,384 | 2/1968 | Voorheis | 431/285 X |
| 3,676,048 | 7/1972 | Sellors, Jr. et al. | 431/285 X |

FOREIGN PATENTS OR APPLICATIONS

| | | | |
|---|---|---|---|
| 1,028,298 | 5/1953 | France | 239/405 |

Primary Examiner—William E. Wayner
Assistant Examiner—William E. Tapolcai, Jr.
Attorney, Agent, or Firm—Charles A. Warren

[57] ABSTRACT

An igniter for the main burner of a gas turbine engine has an air chamber with a discharge passage and the fuel nozzle or tip is positioned within and in spaced relation to the walls of the passage. The tube has a helical member around the portion of the tube within the passage in order to impart a swirl to the air and the member itself is spaced from the passage walls to produce less swirl at the periphery of the air flow through the passage. The size of the device is such that it may operate continuously utilizing fuel from the main burner supply and air from the engine compressor.

11 Claims, 3 Drawing Figures

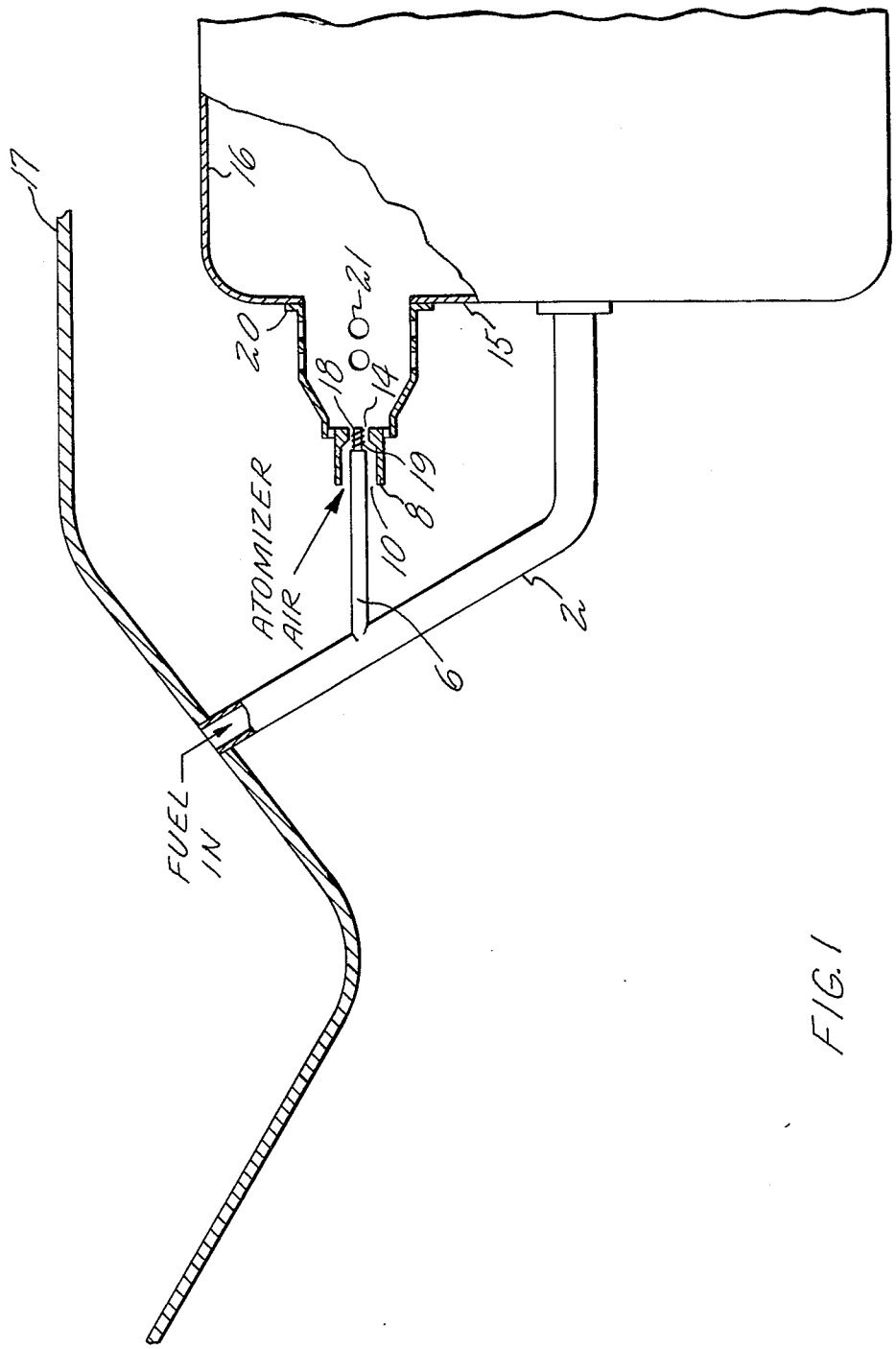

TORCH IGNITER

SUMMARY OF THE INVENTION

Main burner performance is usually compromised because of the difficulty of ignition especially after altitude flame-out. One problem is smoke abatement because of altitude relight requirements. Spark igniters provide a spark of too short duration for some relight requirements and also present a problem in insulating the high energy system of the spark igniter in the high temperature evironment of high performance gas turbines.

According to the present invention, the torch igniter avoids the above objections and is constructed to operate continuously as part of a normal gas turbine cycle drawing air from the compressor and fuel from the main burner supply. The igniter has an air chamber enclosing the fuel tube with an outlet passage in which the end of the fuel tube is positioned. The fuel tube has a helical element on the outside of the portion of the tube located in the passage and the tube and passage are so dimensioned as to provide clearance between the tube and the passage walls. The passage discharges into a combustion chamber for the igniter. This combustion chamber has attachment means for securing the igniter to the wall of the main burner.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a sectional view through the igniter.

DESCRIPTION OF THE PREFERRED EMBODIMENT

Figure 3:
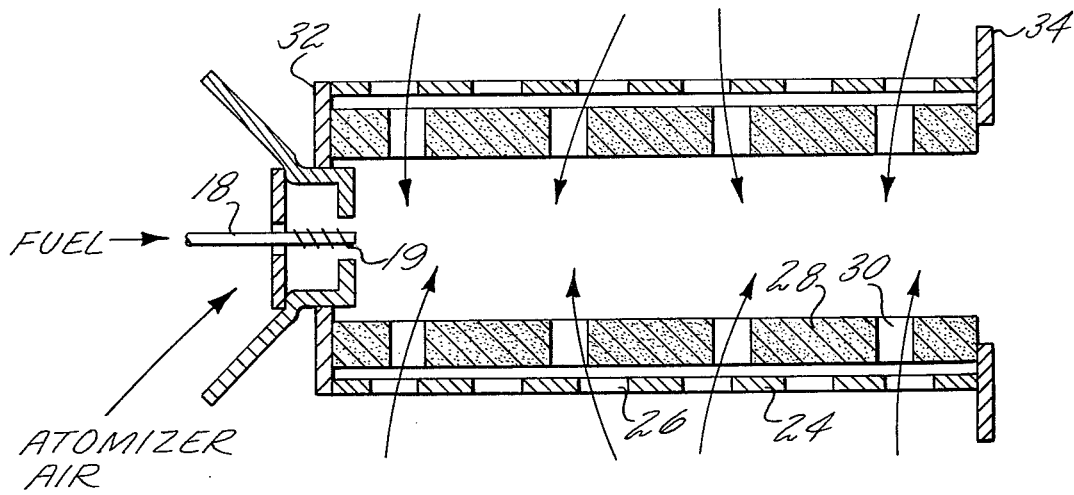
FIG. 3 is a sectional view of a modification.

Referring first to FIG. 1, the engine fuel supply 2 has a lateral fuel tube 6 connected thereto. This tube extends centrally through an air chamber 8 having an air inlet 10 that is open to the compressor discharge. The chamber also has a discharge passage or outlet 14 located at the end of the chamber 8 opposite to the inlet 10 and in which the end of the fuel supply tube is positioned. The igniter is attached to the end wall 15 of the combustor 16 located in the burner duct 17 from the compressor not shown.

Figure 2:
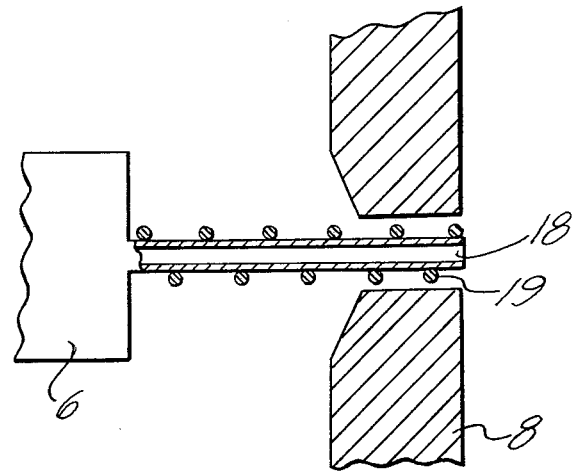
FIG. 2 is an enlarged view of the air passage.

As shown, the wall of the chamber in which the passage 14 is located is relatively thick to give a significant length to this passage. The fuel tube preferably has a small diameter nozzle portion 18 in the passage. As shown in FIG. 2, the diameter of the passage is significantly greater than the outer diameter of the tube and this nozzle portion extends the entire length of the passage and partially into the air chamber. The size of the nozzle is such that a greater tube dimension is utilized for the rest of its length to give the necessary rigidity in the passage area.

A helical element 19 is positioned on or formed on the outer surface of the fuel nozzle, as shown. This element may be, for example, a wire wrapped around the nozzle and secured thereto. The outside dimension of the tube with the element thereon is less than the passage diameter in order to have an unobstructed flow area for air from the chamber. In this way as air flows from the chamber through the passage, the air closest to the nozzle will be given a swirl by the helix so that when it meets the fuel at the discharge end of the nozzle good mixing of the fuel with the air will occur within the cylinder of less rapidly swirling air discharging from the unobstructed part of the passage close to its periphery. This passage with the nozzle structure serves as an atomizer for the fuel.

A combustion chamber is mounted on the air chamber in surrounding relation to the nozzle and discharge passage to receive the air and fuel discharging from said passage. The combustion chamber is preferably larger in diameter than the adjacent part of the air chamber, and at the end remote from the attachment to the air chamber has a mounting flange 20 by which the ingiter may be attached to the end wall of the main burner. A row of holes 21 in the wall of the combustion chamber supply cooling air to the chamber or if necessary additional air for complete combustion.

When reference is made to the main burner, this is intended to include either the engine main burner or the afterburner located downstream of the turbine. These two burners require different igniter characteristics and adaptation of the atomizer, above described, for either burner can be accomplished by minor changes in the configuration. For example, the igniter described and shown was effective for the afterburner and had a passage diameter of 0.101 inch, a nozzle diameter of 0.025 inch O.D., and 0.016 inch I.D. The wire diameter was 0.023 inch leaving an unobstructed gap of 0.015 inch. The helix turns were spaced apart 0.070 inch.

For the main engine burner the passage was 0.125 inch in diameter, the nozzle was 0.035 inch O.D., and 0.023 inch I.D., the wire was 0.033 inch thick leaving an unobstructed gap of 0.012 inch. The wire for the main burner was semicircular in cross section with the flat side adjacent and parallel to the walls of the passage. The spacing of the helical turns was 0.090 inch.

As shown in FIG. 3, a particular form of combustion chamber gives long life to the igniter. In this arrangement the combustion chamber into which the mixture of air and fuel from the atomizing passage 14 is discharged includes an outer wall 24, preferably metallic and having a plurality of rows of holes 26 therein and an inner wall 28 of fibrous ceramic, one form of which is available as Fiberfrax from Carborundum. This inner wall is porous and in addition has a plurality of rows of holes 30 therein. With a large number of holes in each wall, enough of them will coincide to admit the needed air for cooling and for complete combustion. Further, this porous material allows enough air flow through the material for transpiration cooling of the wall to prevent damage from the heat of the flame in the combustion chamber. The purpose of not having all the holes in both walls in alignment is to assure the flow of enough air through the material to make the transpiration cooling effective. As will be apparent the outer wall 24 has an attachment flange 32 at its upstream end for securing the combustion chamber to the air chamber and the downstream end has an attachment flange 34 by which the combustion chamber is secured to the wall of the main burner.

For ignition of the igniter a suitable spark plug may be provided. Since such devices are well known it is not shown or described.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An igniter for the burner of a gas turbine including:
   a fuel supply tube;
   an air chamber surrounding said tube and having an elongated outlet passage, in which the discharge end of the tube is positioned; and
   a helical member on the outside of the tube at the outlet and spaced from the walls of the outlet to define an unobstructed air passage around the helix, the air closest to the tube being given a swirl by said helical member so that when it meets the fuel at the discharge end of the tube good mixing of the fuel with the air will occur within the cylinder of less rapidly swirling air discharging from the unobstructed air passage close to the periphery of said tube.

2. An igniter as in claim 1 in which the helix is a small diameter wire wound on the supply tube.

3. An igniter as in claim 2 in which the air passage around the wire is smaller than the diameter of the wire.

4. An igniter as in claim 1 including a combustion chamber mounted on the air chamber to surround the outlet and to receive the fuel and air mixture therefrom, said combustion chamber having side wall openings for the admission of air for combustion.

5. An igniter for attachment to a main burner of a gas turbine engine, including:
   an air chamber having an air inlet and an elongated air discharge outlet passage;
   a fuel tube extending through said air chamber and into said passage, said tube at least near to the passage and in said passage being smaller in diameter than said passage to provide a clearance for air flow around said tube; and
   a helical member around and in contact with the portion of said tube near to and in said outlet passage and leaving an unobstructed space between said member and the wall of the outlet passage, the air closest to the tube being given a swirl by said helical member so that when it meets the fuel at the discharge end of the tube good mixing of the fuel with the air will occur within the cylinder of less rapidly swirling air discharging from the unobstructed air passage close to the periphery of said tube.

6. An igniter as in claim 5 including a combustion chamber mounted on said air chamber to surround the outlet passage, said chamber being larger than said passage, and into which the fuel and air from said passage is discharged for combustion.

7. An igniter as in claim 5 in which the clearance around the helical member is less than the thickness of said member.

8. An igniter as in claim 5 in which the tube terminates substantially at the outer end of the passage.

9. An igniter as in claim 6 in which the helical member is a wire and the helix formed has a relatively high pitch.

10. An igniter as in claim 6 in combination with a combustion chamber into which the passage discharges, said combustion chamber having a porous fibrous ceramic inner wall and a surrounding supporting wall, both walls having a large number of holes therethrough for admission of air to said chamber at least some of the holes in the walls being out of alignment.

11. An igniter as in claim 10 in which the outer wall of the combustion chamber is secured at one end to said air chamber, and has mounting means at the opposite end for attachment to the wall of the main burner.

* * * * *